3,355,499
**PROCESS FOR PREPARING PHENOL MONO-
ETHERS OF MONO- AND POLYETHYLENE
GLYCOLS**
Arthur Freeman, Linden, and Harry Kaplan, Westfield,
N.J., assignors to General Aniline & Film Corporation,
New York, N.Y., a corporation of Delaware
No Drawing. Filed June 1, 1962, Ser. No. 199,254
4 Claims. (Cl. 260—613)

This invention relates to an improved process for the preparation of phenol monoethers of mono- and polyethylene glycols by condensation of phenols and lower alkylene oxides.

Such condensation is conventionally carried out in known processes by admixing the alkylene oxide at elevated temperature and pressure with a phenol in the presence of a nucleophile catalyst, especially a caustic alkali. The resulting products are phenol monoethers of mono- and poly-alkylene glycols, of which an important group are nonionic surface-active agents ("surfactants") having emulsifying, wetting, dispersing, foaming and/or detergent properties in aqueous media. They also serve as intermediates for important classes of anionic surfactants, for example, the sulphuric ester salts of the phenol-glycol ethers.

When prepared in accordance with known processes, the aforesaid alkylene oxide condensation products have a relatively dark color which seriously impairs their usefulness for many surfactant applications. On the other hand, decolorization of these products is inconvenient and costly.

According to PB Reports No. 6,684 and No. 81,819, the general procedure employed in German industry for preparation of compounds of the aforesaid class comprises mixing the catalyst with an alkylphenol (and in some cases also with part of the alkylene oxide) at room temperature or lower, heating the mixture and adding the alkylene oxide (or the balance thereof) at an elevated reaction temperature. In a German patent application dated December 11, 1935, appearing in P.B.L. 28,123, the process described involves mixing a catalytic amount of caustic soda with a molten alkylphenol, heating to a reaction temperature of 120° to 130° C., and introducing ethylene oxide at this temperature until about 10 mols are absorbed. PB Report No. 86,145 (BIOS Final Report No. 1483, item No. 22) of 1947 describes manufacture of alkylphenol-polyglycol ethers by I. G. Farbenindustrie A.G., at Hoechst, as involving transfer of alkylphenol from a weigh tank to the reactor, adding the catalyst, displacing the air in the reactor with nitrogen, heating to 160° C. over a period of 1 to 1½ hours, and introducing ethyleneoxide at this temperature. The products obtained in these processes are relatively dark in color and are therefore either subject to serious limitations in their use as surfactants, or require costly and tedious decolorization.

We have discovered that the discoloration occurring as above in known processes for preparation of phenol mono- and polyglycol ethers can be largely avoided by pre-heating the phenol in an inert atmosphere and in the absence of the catalyst to a temperature of at least 100° C. but not less than 50° C. (preferably not less than 20° C.) below the range employed for alkoxylation, adding the catalyst just prior to introduction of the alkylene oxide, and then introducing the alkylene oxide while heating to reaction temperature.

Our invention will be more fully understood by the following examples, wherein parts and percentages are by weight unless otherwise indicated.

*Example 1*

488 parts (4 mol parts) of ethyl phenol were introduced into a pressure vessel fitted with an agitator and with heating and cooling facilities. After testing for vacuum and pressure, the reaction vessel was purged with nitrogen and then evacuated while maintaining a nitrogen atmosphere, and the charge was heated to 100° C. At this point, 5 parts of caustic potash were added, the flow of nitrogen was discontinued, and the vacuum released by introducing ethylene oxide to a gauge pressure of 1 atmosphere. 352 parts (6.5 mol parts) of ethylene oxide were gradually introduced while maintaining the pressure at 5 to 6 atmospheres and the temperature at 110° to 120° C. When addition of the ethylene oxide was complete, the contents of the reaction vessel were agitated until the gauge pressure returned to 0, and then cooled and discharged. 840 parts of ethylphenoxy-polyethoxyethanol were obtained, having a VCS color (a rating on the Varnish Color Scale-Gardner Scale 1933) of 2.

Upon repeating the foregoing procedure with the exception that the caustic potash was introduced at the outset together with ethyl phenol at room temperature (20–30° C.), 840 parts of ethylphenoxy-polyethoxyethanol were obtained having a VCS color of 7.

*Examples 2 to 15*

Preparation of a series of alkylphenol-alkyleneoxide condensation products was carried out in each case under comparative conditions as in the foregoing Example 1, with variations in the proportions, catalysts, pressures and temperatures, and using alkylphenols containing various alkyl groups and in a few cases propylene oxide or butylene oxide instead of alkylene oxide. The yield in each case varied less than 1 % from the theoretical yield. A comparison was made in each case of the color (on the VCS scale) of the condensation product obtained by adding the catalyst after the alkylphenol was heated to a temperature of at least 100° C. and not more than 50° C. below the condensation temperature range, with the corresponding color obtained upon incorporating the catalyst with the alkylphenol at room temperature. The details of the series of preparation and results thereof are given in the following tabulation:

| Example No. | Reagents and Catalysts (Parts by Wt.) | Mol Ratio: Alkylene Oxide to Phenol | Catalyst Addition Temperature, °C. | Condensation Temperature, °C. | Gauge Pressure (Atm.) | VCS Color |
|---|---|---|---|---|---|---|
| (2) | 680 Propyl phenol<br>1,110 Ethylene oxide<br>1 NaOH | 5.1<br>5.1 | 160<br>20–30 | 170–180<br>170–180 | 4<br>4 | 1<br>8 |
| (3) | 600 Butyl Phenol<br>1,760 Ethylene oxide<br>1 KOH | 8.1<br>8.1 | 150<br>20–30 | 160–170<br>160–170 | 9–10<br>9–10 | 1<br>9 |
| (4) | 1,476 Amyl phenol<br>11,880 Ethylene oxide<br>3 NaOH | 24.5<br>24.5 | 140<br>20–30 | 150–160<br>150–160 | 7–8<br>7–8 | 1<br>8 |
| (5) | 824 Octyl phenol<br>2,640 Ethylene oxide<br>2 NaOH | 12.2<br>12.2 | 120<br>20–30 | 130–140<br>130–140 | 1–2<br>1–2 | 1<br>7 |
| (6) | 309 Dibutyl phenol<br>726 Ethylene oxide<br>0.5 KOH | 9<br>9 | 130<br>20–30 | 140–150<br>140–150 | 1–2<br>1–2 | 1<br>6 |
| (7) | 220 Nonyl phenol<br>440 Ethylene oxide<br>0.1 NaOH | 8.1<br>8.1 | 140<br>20–30 | 180–190<br>180–190 | 1–2<br>1–2 | 1<br>8 |
| (8) | 220 Nonyl phenol<br>58 Propylene oxide<br>0.1 NaOH | 8.5<br>8.5 | 140<br>20–30 | 150–160<br>150–160 | 2–3<br>2–3 | 2<br>9 |
| (9) | 2,620 Dodecyl phenol<br>7,200 Butylene oxide<br>10 KOH | 8.7<br>8.7 | 160<br>20–30 | 170–180<br>170–180 | 4–5<br>4–5 | 1<br>8 |
| (10) | 2,620 Dodecyl phenol<br>7,200 Butylene oxide<br>10 KOH | 8.7<br>8.7 | 160<br>20–30 | 170–180<br>170–180 | 4–5<br>4–5 | 1<br>8 |
| (11) | 393 Tributylphenol<br>1,320 Ethylene oxide<br>0.5 NaOH | 16.3<br>16.3 | 110<br>20–30 | 120–130<br>120–130 | 4–5<br>4–5 | 1<br>6 |
| (12) | 792 Octadecylphenol<br>1,760 Ethylene oxide<br>1 KOH | 18.2<br>18.2 | 175<br>20–30 | 190–200<br>190–200 | 3–4<br>3–4 | 2<br>7 |
| (13) | 3,460 Dinonyl phenol<br>4,440 Ethylene oxide<br>10 NaOH | 8.1<br>8.1 | 100<br>20–30 | 110–120<br>110–120 | 1–2<br>1–2 | 2<br>9 |
| (14) | 4,300 Didodecyl phenol<br>8,800 Ethylene oxide<br>4 KOH | 16.3<br>16.3 | 140<br>20–30 | 150–160<br>150–160 | 8–9<br>8–9 | 2<br>9 |
| (15) | 598 Dioctadecyl phenol<br>440 Ethylene oxide<br>1 NaOH | 8.1<br>8.1 | 150<br>20–30 | 160–170<br>160–170 | 3–4<br>3–4 | 1<br>9 |

Instead of the alkylphenols of the foregoing examples, corresponding alkyl substituted resorcinols can be employed, as well as nuclear substituted derivatives of said phenols in which substituents such as chlorine and bromine which are unreactive under the conditions of the invention are present in the nucleus.

As illustrated in the examples, the alkylene oxides which are employed in the improved process of the invention contain 2 to 4 carbon atoms. Alkyl phenols which can be advantageously converted to corresponding glycol ethers by the improved process may be represented by the general formula $$(R)_x\text{—Ar—}(OH)_y$$

wherein R represents an alkyl group of 1 to 24 carbon atoms, $x$ and $y$ respectively represent integers from 1 to 2, and Ar represents a benzene hydrocarbon radical. When two nuclear alkyl groups are present, they can be similar or dissimilar.

In carrying out the process of the invention, the molar ratio of alkylene oxide to alkyl phenol can range from 1 to 100, but is preferably from 1 to 30. The alkaline catalyst employed is preferably a caustic alkali such as the hydroxide of an alkali metal e.g. sodium or potassium hydroxide, and is used in an amount corresponding approximately to 0.1 to 1.0% of the weight of alkyl phenol. Operating pressures, while not critical, are conveniently adjusted to 1 to 15 atmospheres (gauge pressure). Reaction temperatures range substantially from 110 to 200° C.

Preliminary heating of the alkyl phenol is effected in an inert atmosphere such as nitrogen. The temperature at which the catalyst is added is at least 100° C. but not substantially higher than the selected reaction temperature range and not less than 50° C. (preferably, not less than 20° C.) below the selected reaction temperature range. Directly after addition of the catalyst, the alkylene oxide is introduced and the mixture heated to the selected reaction temperature, the pressure being suitably maintained from 1 to 15 atmospheres (gauge pressure) by progressive introduction of alkylene oxide until the desired proportion thereof has been absorbed in the reaction mixture. The reaction is then interrupted by cooling and releasing the pressure.

As indicated by the results of the examples, a surprising improvement occurs in the color of the condensation product obtained by the improved procedure of this invention.

Variations and modifications which will be obvious to those skilled in the art can be made in the procedure of the foregoing examples without departing from the spirit or scope of the invention.

We claim:

1. In the process of condensing an alkylene oxide of 2 to 4 carbon atoms with an alkyl phenol at a temperature substantially within the range of 110 to 200° C. in the presence of an alkaline catalyst, the improvement which comprises pre-heating the alkyl phenol in an inert atmosphere to a temperature of at least 100° C., but not substantially higher than, and not more than 50 centigrade degrees below, the selected reaction temperature range, adding the alkaline catalyst to the pre-heated alkyl phenol at said temperature, and thereupon introducing the alkylene oxide while heating the mixture to the selected reaction temperature range.

2. Process as defined in claim 1 wherein the temperature at which the alkaline catalyst is added to the alkyl phenol is not more than 20 centigrade degrees below the selected reaction temperature range.

3. Process as defined in claim 2 wherein the catalyst is an alkali metal hydroxide employed in an amount from 0.1 to 1.0% of the quantity of alkyl phenol, and the molar ratio of alkylene oxide to alkyl phenol is within the range from 1 to 100.

4. Process as defined in claim 3 wherein the reaction pressure ranges from 1 to 15 atmospheres (gauge pressure), the alkyl groups of said alkyl phenol contain 1 to 24 carbon atoms and the molar ratio of alkylene oxide to alkyl phenol is within the range from 1 to 30.

References Cited

UNITED STATES PATENTS

| | | | |
|---|---|---|---|
| 2,508,035 | 5/1950 | Kosmin | 260—615 |
| 2,508,036 | 5/1950 | Kosmin | 260—615 |
| 2,673,882 | 3/1954 | Griffin | 260—615 |

FOREIGN PATENTS 695,036  8/1953  Great Britain.

LEON ZITVER, *Primary Examiner.*

BERNARD HELFIN, *Examiner.*